UNITED STATES PATENT OFFICE.

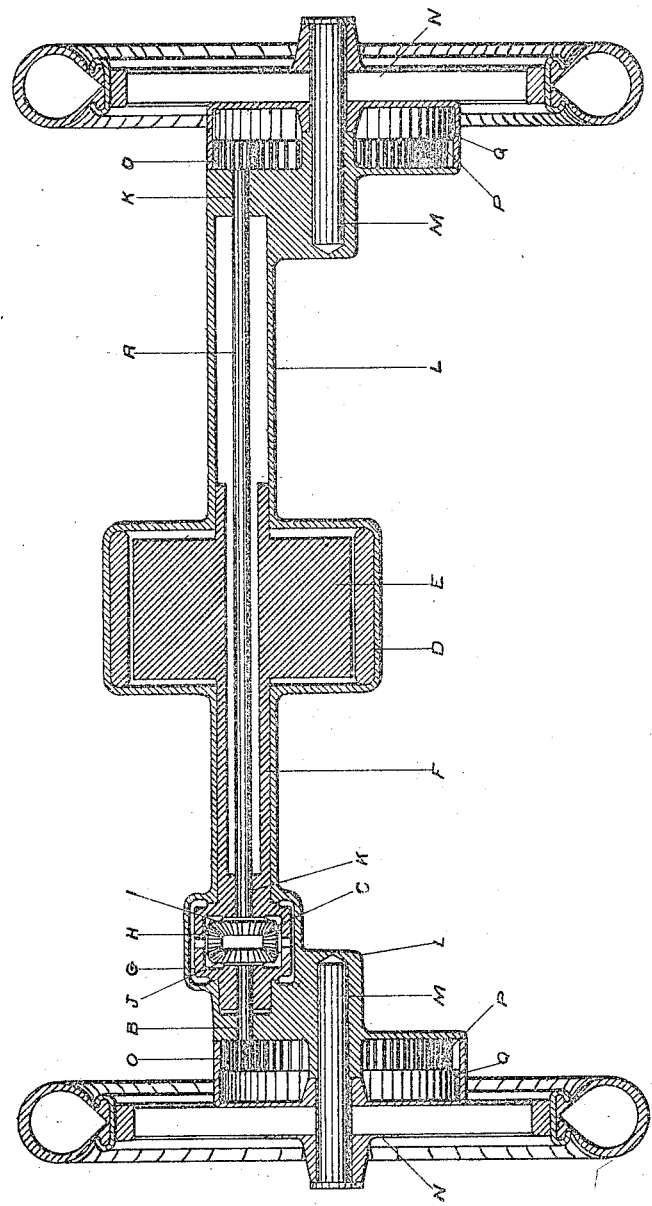

WILLIAM EMIL BOCK, OF TOLEDO, OHIO.

VEHICLE DRIVE MECHANISM.

1,144,752.  Specification of Letters Patent.  Patented June 29, 1915.

Application filed July 16, 1912. Serial No. 709,653.

*To all whom it may concern:*

Be it known that I, WILLIAM EMIL BOCK, a citizen of the United States of America, residing at Toledo, in the county of Lucas and State of Ohio, have invented certain new and useful Improvements in Vehicle Drive Mechanism, of which the following is a specification, reference being had therein to the accompanying drawings.

The invention relates to vehicle drive mechanisms and consists in the peculiar construction, arrangement and combination of a motor and compensating gearing as hereinafter set forth.

In the drawings, the motor and compensating gearing is shown in longitudinal section as applied to a vehicle drive mechanism.

A and B are two alined shafts constituting either the vehicle drive axle or the jack-shaft employed for driving the vehicle wheels.

C is a compensating gearing connecting the two shafts A and B, which may be of any suitable construction, but is shown as the bevel-gear type.

It is usual to drive the compensating gearing through the medium of a chain, gearing, or shaft. With my improved construction I mount the drive member of the compensating gearing directly upon the motor shaft, and form the latter hollow or tubular for the passage of the jack-shaft or axle. In detail, D is an electric motor and E the armature thereof, which is mounted upon a hollow shaft F. G is the drive member of the compensating gearing, which is mounted directly upon the shaft F, and engages the bevel pinions H, which are in mesh with the bevel-gear wheels I and J respectively upon the shafts A and B. The shaft A passes axially through the hollow or tubular shaft F and is journaled in suitable bearings such as K.

With the construction shown the motor and compensating gearing are housed within the axle casing L, at the opposite ends of which are stub axles M, on which the wheels N are journaled. The shafts A and B have mounted at their outer ends the pinions O which are in mesh with the internal gears P, the latter being formed on the interior of the brake drums Q for the vehicle wheels.

The construction described is one which gives an exceedingly compact and convenient arrangement of parts, as the motor is concentric with the axle or jack-shaft, and at the same time drives the latter through the medium of the compensating gearing.

What I claim as my invention is:

1. The combination with an axle casing having off-set stub axles at its opposite ends, axially alined shafts passing through said casing, a compensating gearing connecting said shafts, an electric motor concentric with said shafts, a hollow armature shaft for said motor sleeved upon one of said alined shafts, a head mounted on said hollow shaft forming the drive member of said compensating gearing, internal gears concentrically arranged on said stub axles, and pinions on the ends of said alined shafts meshing with said internal gears.

2. The combination with an axle casing having off-set stub axles at its opposite ends, of brake drums provided with integral internal gears concentrically arranged on said stub axles, and means within said axle casing for driving said internal gears.

In testimony whereof I affix my signature in presence of two witnesses.

WILLIAM EMIL BOCK.

Witnesses:
 FRANK H. GEER,
 R. W. KIRKLEY.